(12) United States Patent
Sosinsky et al.

(10) Patent No.: US 12,579,429 B2
(45) Date of Patent: Mar. 17, 2026

(54) DEEP LEARNING BASED EMAIL CLASSIFICATION

(71) Applicant: Avanan, Inc., San Carlos, CA (US)

(72) Inventors: Tanya Adam Sosinsky, Rosh haayin (IL); Natan Katz, Tel Aviv (IL)

(73) Assignee: Avanan, Inc.

( * ) Notice: Subject to any disclaimer, the term of this patent is extended or adjusted under 35 U.S.C. 154(b) by 896 days.

(21) Appl. No.: 17/571,899

(22) Filed: Jan. 10, 2022

(65) Prior Publication Data

US 2023/0222333 A1     Jul. 13, 2023

(51) Int. Cl.
    *G06N 3/08*        (2023.01)
    *H04L 9/40*        (2022.01)

(52) U.S. Cl.
    CPC ........... *G06N 3/08* (2013.01); *H04L 63/1483* (2013.01)

(58) Field of Classification Search
    CPC .............................. G06N 3/08; H04L 63/1483
    See application file for complete search history.

(56) References Cited

U.S. PATENT DOCUMENTS

| | | | |
|---|---|---|---|
| 10,181,957 B2 * | 1/2019 | Srivastava | ............... H04L 12/14 |
| 2023/0196071 A1 * | 6/2023 | Park | ........................ G06N 3/045 |
| | | | 706/25 |

OTHER PUBLICATIONS

Gansterer, Wilfried N. and David Pölz. "E-Mail Classification for Phishing Defense." European Conference on Information Retrieval (2009). (Year: 2009).*

Baum, Andreas and Meelis Kull. "Cost-sensitive classification with deep neural networks." (2020). (Year: 2020).*

Ryou, Serim et al. "Anchor Loss: Modulating Loss Scale Based on Prediction Difficulty." 2019 IEEE/CVF International Conference on Computer Vision (ICCV) (2019): 5991-6000. (Year: 2019).*

Du, Shuangjiang et al. "Scale-Sensitive IOU Loss: An Improved Regression Loss Function in Remote Sensing Object Detection." IEEE Access 9 (2021): 141258-141272. (Year: 2021).*

Lee, Jehyun et al. "D-Fence: A Flexible, Efficient, and Comprehensive Phishing Email Detection System." 2021 IEEE European Symposium on Security and Privacy (EuroS&P) (2021): 578-597. (Year: 2021).*

Bhatti, Palwasha et al. "Email Classification using LSTM: A Deep Learning Technique." 2021 International Conference on Cyber Warfare and Security (ICCWS) (2021): 100-105. (Year: 2021).*

Gangavarapu, Tushaar et al. "Applicability of machine learning in spam and phishing email filtering: review and approaches." Artificial Intelligence Review (2020): 1-63. (Year: 2020).*

Hina, Maryam et al. "SeFACED: Semantic-Based Forensic Analysis and Classification of E-Mail Data Using Deep Learning." IEEE Access 9 (2021): 98398-98411. (Year: 2021).*

(Continued)

*Primary Examiner* — Kevin W Figueroa
*Assistant Examiner* — Victor Adelard Nault
(74) *Attorney, Agent, or Firm* — Renner, Otto, Boisselle & Sklar, LLP

(57)            ABSTRACT

A computer training device and method is provided for training a deep learning algorithm to classify incoming emails as belonging to one of multiple categories. The deep learning algorithm uses a loss function to avoid a low precision risk caused by a number of received emails for at least two of the multiple categories being imbalanced (e.g., by at least two orders of magnitude). The loss function compensates for the imbalance in received emails by changing depending on the criticality of the score being determined.

18 Claims, 3 Drawing Sheets

(56) References Cited

OTHER PUBLICATIONS

Gu, XiaoQing, TongGuang Ni, and Wei Wang. "Online Imbalanced Support Vector Machine for Phishing Emails Filtering." TELKOMNIKA Indonesian Journal of Electrical Engineering 12.6 (2014): 4306-4313. (Year: 2014).*

Abu-Nimeh, Saeed, et al. "A comparison of machine learning techniques for phishing detection." Proceedings of the anti-phishing working groups 2nd annual eCrime researchers summit. 2007. (Year: 2007).*

* cited by examiner

100

120

DEEP LEARNING BASED EMAIL CLASSIFICATION

TECHNICAL FIELD

The present disclosure relates generally to email classification and more particularly to email classification using deep learning.

BACKGROUND

Deep learning algorithms often achieve a better accuracy than classical machine learning algorithms. While deep learning algorithms perform well in research tasks, they are endowed with weaknesses and are typically limited to commercial applications involving vision or sentiment analysis.

Deep learning algorithms learn to map a set of inputs to a set of outputs from training data. Deep learning algorithms are often trained using stochastic gradient descent and use a loss function to calculate errors during training. In particular, the deep learning algorithms use the loss function during training to modify the weights applied to neural network(s) underlying the deep learning algorithms.

Typically, with neural networks, we seek to minimize the loss function (also referred to as a cost function or error function) and the value calculated by the loss function is referred to as "loss." The loss function is relied upon to distill all aspects of the deep learning algorithm down into a score, such that improvements in the score are a sign of a better deep learning algorithm. In this way, the loss function allows candidate solutions to be ranked and compared.

It is important, therefore, that the loss function faithfully represents design goals. If a poor error function is chosen, unsatisfactory results may be obtained due to improperly specified goals of the algorithm.

SUMMARY

The present disclosure provides a deep learning-based email classification engine for classifying incoming emails. In a general embodiment, the present disclosure provides a system for performing email phishing detection.

According to one aspect of the disclosure, there is provided a computer training device and method for training a deep learning algorithm to classify incoming emails as belonging to one of multiple categories and to avoid a low precision risk caused by a number of received emails for at least two of the multiple categories being imbalanced by at least two orders of magnitude (i.e., receiving at least one hundred times as many emails of one category compared to another category).

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
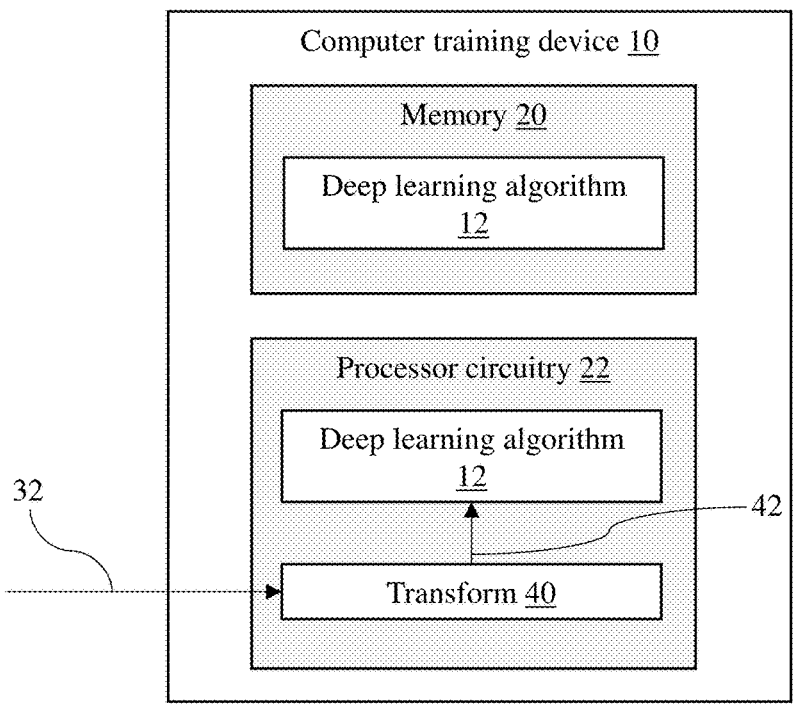
FIG. 1 is a block diagram of an exemplary embodiment of a computer training device.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a computer training device and method is provided for training a deep learning algorithm to classify incoming emails as belonging to one of multiple categories. The deep learning algorithm uses a loss function to avoid a low precision risk caused by a number of received emails for at least two of the multiple categories being imbalanced (e.g., by at least two orders of magnitude). The loss function compensates for the imbalance in received emails by changing depending on the criticality of the score being determined.

Turning to FIG. 1, a computer training device 10 for training a deep learning algorithm 12 to classify incoming emails is shown. The training device 10 classifies emails as falling into (also referred to as belonging to) one of multiple categories. For example, the multiple categories may include phishing, spam, marketing, and clean. Each of the multiple categories of emails has a criticality identifying the category as non-critical or critical. For example, the phishing category may be identified as critical, and the spam, marketing, and clean categories may be identified as non-critical.

The number of received emails for at least two of the multiple categories is imbalanced by at least two orders of magnitude (e.g., three or four orders of magnitude). That is, the number of one category of emails received is far less than the number of emails received for another category of emails. As described in further detail below, this imbalance may result in low precision of the deep learning algorithm 12 if not properly compensated for.

The training device 10 includes a memory 20 storing the machine learning algorithm 12 and a processor circuitry 22. The processor circuitry 22 receives training data 24 for multiple emails 26. In the embodiment shown in FIG. 2, for each of the multiple emails 26a, 26b, the training data 24 includes one or more data elements 27a, 27b. Each data element 27 includes email content 28a, 28b and a correct classification label 30a, 30b. When receiving email content 28 for an email 26, the deep learning algorithm 12 is configured to determine multiple classification scores 34 based on the received email content 28 and to output at least one of the determined multiple classification scores 34. Each of the multiple classification scores 34 is associated with one of the multiple categories and estimates a probability that the received email falls into the category associated with the classification score 34. During training, the outputted classification score(s) 34 may be used to update the machine learning algorithm 12 (i.e., to improve performance of the machine learning algorithm 12). As described below, during classification of incoming emails the outputted classification score(s) 34 may be used to determine the category that the received email falls into.

As described above, email traffic is often extremely imbalanced. For example, for each phishing email 10,000-100,000 non phishing emails may be received. This creates an issue using traditional classification models that aim to optimize the accuracy (e.g. classification models that are trained using a standard cross-entropy function). Using a classification model to optimize accuracy for imbalanced classes has a risk of low precision risk. For example, if 1,000 phishing emails are received and 1,000,000 non-phishing emails are received, a deep learning algorithm providing 0.5% equal error rate (EER) will correctly classify 995 phishing emails as phishing emails, and incorrectly classify 5000 non-phishing emails as phishing emails. That is, when 99.5% of emails are accurately predicted, only 1 out of 6 emails classified as phishing emails will be correctly classified.

To address this risk of low precision, the processor circuitry 22 trains the deep learning algorithm 12 using a loss function (also referred to as a regulation function) configured to compensate for the imbalance in at least two of the multiple categories of email. For example, the processor circuitry 22 may train the deep learning algorithm 12 by attempting to minimize the loss function. The loss function compensates for this imbalance by changing depending on the criticality of the score 34 being determined. That is, when the deep learning algorithm 12 outputs a classification score 34 for one of the multiple categories identified as non-critical, a primary loss function is used. Conversely, when the deep learning algorithm 12 outputs a classification score 34 for one of the multiple categories identified as critical, a critical loss function is used. The critical loss function uses a compensating function to modify the primary loss function. The criticality of each of the categories may be set in any suitable manner. For example, the criticality may be set automatically (e.g., using defaults) or a user may set the criticality of each of the categories.

Figure 4:
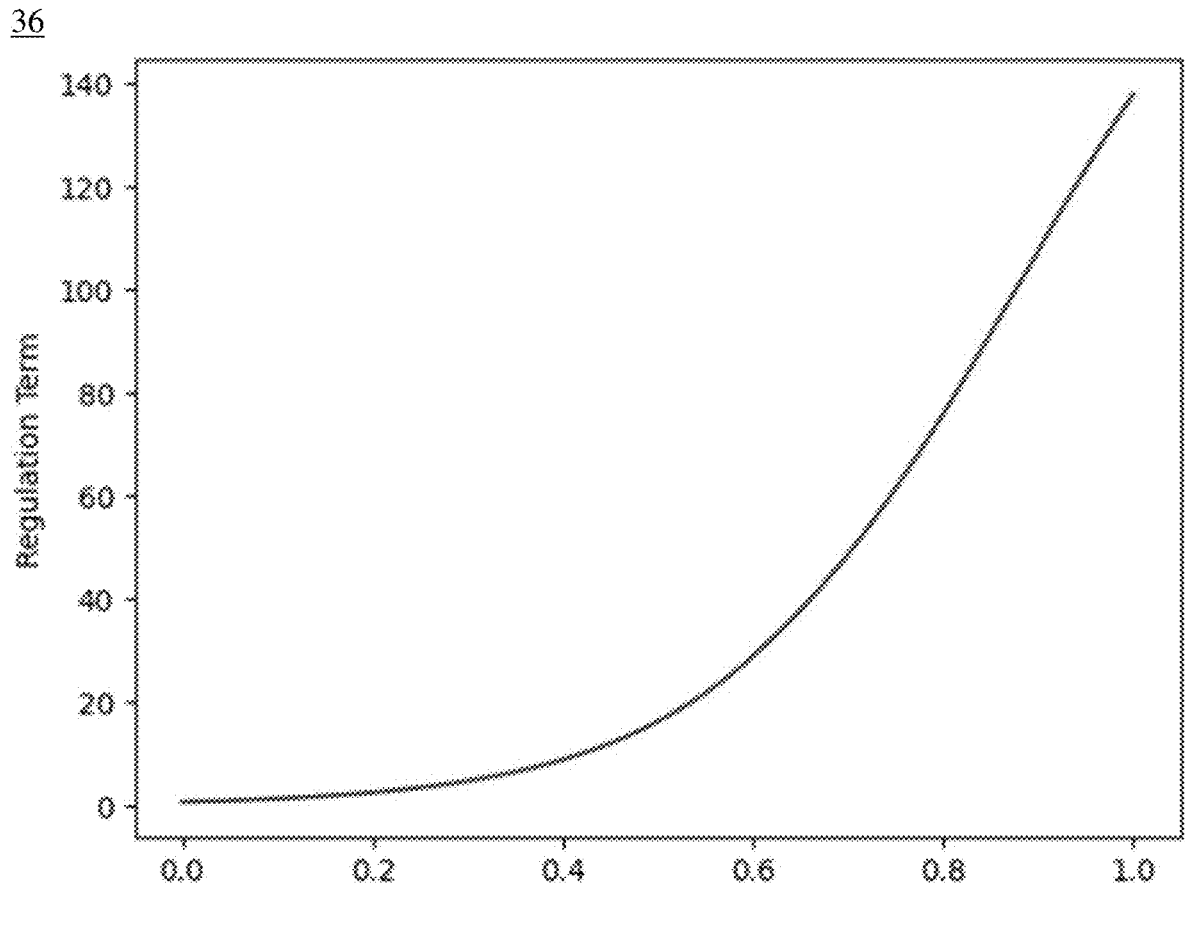
FIG. 4 shows an exemplary compensating function.

Precision may be improved by punishing False Positive events. For this reason, the compensating function outputs a low value (e.g., zero) when the email is correctly classified as belonging to the critical category. The compensating function may also output a low value (e.g., zero) when the email is incorrectly classified as belonging to the non-critical category. Conversely, the compensating function outputs a higher value when the email is incorrectly classified as belonging to the critical category. The value output by the compensating function may increase based on the classification score, such that a higher classification score for the email belonging to the critical category (i.e., incorrectly signifying a higher probability of the email belonging to the critical category) results in the compensating function outputting a higher value. In this way, the compensating function outputs a higher non-negative value when incorrectly classifying an email 26 as being of the critical category to more strongly punish for emails being incorrectly classified as critical (i.e., false positives). An exemplary compensating function is shown in FIG. 4, where the x-axis represents the classification score output by the deep learning algorithm for an email that is incorrectly classified as belonging to a critical category and the y-axis represents the output of the compensation function.

In one embodiment, the primary loss function is a cross-entropy function taking as an input each of the classification scores output by the deep learning algorithm and the actual category to which the input to the deep learning algorithm belongs. The cross-entropy may be used to measure the error between two probability distributions. Cross-entropy as used herein is not limited to the negative log-likelihood of a Bernoulli or SoftMax distribution. Rather, any loss consisting of a negative log-likelihood is a cross-entropy between the empirical distribution defined by the training set and the probability distribution defined by model. For example, mean squared error is the cross-entropy between the empirical distribution and a Gaussian model.

The compensating function may use a tan h function that takes as an input each of the classification scores output by the deep learning algorithm associated with a category identified as critical. For example, the primary loss function may be equal to:

$$\Sigma_{i=[1,\ \ldots\ ,number\ of\ categories]}{}^{-y_i log(\hat{y}_i)}$$

where $\hat{y}_i$ is the classification score which is calculated by the DL engine for category i, and $y_i$ is an indicator which equals 1 if the sample's label is i and 0 if the sample's label is not i.

In one embodiment, let A represent a set of class names (e.g. {"clean", "phishing", "marketing", "spam"}) with the number of classes by ord(A). Let B represent a set of integers {1, 2, 3, . . . , ord(A)}. A deterministic injective and surjective function F may be defined where F: B->A (e.g., the inverse of F induces a numerical order on A). A vector X is a stochastic vector if it satisfies the following: all of its entries are non-negative and its L1 norm is always 1. The loss function receives two vectors: y—a stochastic vector that nearly always having an entry i indicating the label for the class F(i); and ŷ—a stochastic vector having an entry i indicating the probability that a given input to the neural network belongs to class F(i). In this example, the loss function is equal to:

$$L(y,\hat{y})=-<y,\ log(\hat{y})>$$

where log is calculated elementwise

The compensating function for a given data sample becomes $$Z(y)*100(1+tan\ h(\mu*\hat{y}_c+b)$$

where $\hat{y}_c$ is the probability for the sample to belong to a critical category, Z(y) is equal to 1 if the category is identified as non-critical and 0 if the category is identified as a critical category (e.g., Z(y)=[y< > critical category]), and μ and b are constants. The constants μ and b may be selected to map the probabilities' interval represented by the classification scores (e.g., [0,1]) to the slope of tan h. For example, μ and b may be selected such that the compensatory function close to the limit of −1 at an x value of −2 and approaches close to the limit of 1+1 at an x value +2. The constants μ and b may be selected such that from an interval of 0.1 to 1, the compensating function has a value of −2.5 to 0.4. This may be accomplished by defining μ and b as follows:

$$b=-2.5-\mu*0.1$$

$$\mu=(0.4+2.5)/(1.0-0.1)$$

In one embodiment, the compensating function is added to the primary loss function. For example, the loss function L may be defined as follows:

$$L = -<y \log(\hat{y})> + Z(y)*100(1+\tan h(\mu*\hat{y}_c+b)$$

In another embodiment, the loss function may use a Wasserstein metric. For example, the Boolean function Z may be defined as follows:

$$Z(i)=1 \text{ if } (i<> \text{ critical category}), \text{ Else } -1$$

such that the loss function L is defined as follows:

$$L = \Sigma_i Z(i)*\hat{y}_i$$

In one embodiment, the compensation function satisfies the following: for non-relevant errors according to exterior information such as business logic, the compensation function vanishes; and for those errors that are considered severe, the compensation function penalizes with big values and big gradient magnitude. For example, false positives involving phishing may be identified as more severe than other false positives. In this embodiment, we may define the function Z by denoting the index k such that F(k)="phishing" with Z ($y_K==1$)=0 and Z($y_K<>1$)=1. Z may then be multiplied by a function of the form: G ($\hat{Y}$)=M*(1+tan h($\mu\hat{y}_k+b$), where $\hat{y}_k$ is the kth entry of $\hat{y}$ (i.e. the probability according to the trained algorithm that the input is phishing). M is a positive large number (e.g., 100) that boosts the compensation value. $\mu$ and b are constants. The constants $\mu$ and b may be selected to map the probabilities' interval represented by the classification scores (e.g., [0,1]) to the slope of tan h. For example, $\mu$ and b may be selected such that the compensatory function close to the limit of −1 at an x value of −2 and approaches close to the limit of 1+1 at an x value+2.

The constants $\mu$ and b may be selected such that from an interval of 0.1 to 1, the compensating function has a value of −2.5 to 0.4. This may be accomplished by defining $\mu$ and b as follows:

$$b=-2.5-\mu*0.1$$

$$\mu=(0.4+2.5)/(1.0-0.1)$$

In other embodiments of the compensation function, we may revert Z and alter the direction of the tan h to improve the recall:

$$Z(y_K==1)=1$$

$$Z(y<>1)=0$$

$$b=-2.5-\mu*0.4$$

$$\mu=(0.4+2.5)/(0-0.4)$$

where G preserves its canonical form.
In another embodiment, the loss function may use a Wasserstein metric. For example, the Boolean function Z may be defined as follows:

$$Z(y)=1 \text{ if } (y_K<>1), \text{ Else } -1$$

$$G(\hat{y})=\hat{y}_k$$

In the above embodiments the compensating function is added to the primary loss function.

$$L_{new}(y,\hat{y})=-<y, \log \hat{y}>+Z(y)*G(\hat{y})$$

Z can be continuous or Boolean.
In one embodiment, Z and G may be a vector. In this embodiment, $L_{new}$ may be rewritten as follow $$L_{new}(y,\hat{y})=-<y, \log \hat{y}>+<Z(y),G(\hat{y})>$$

Figure 2:
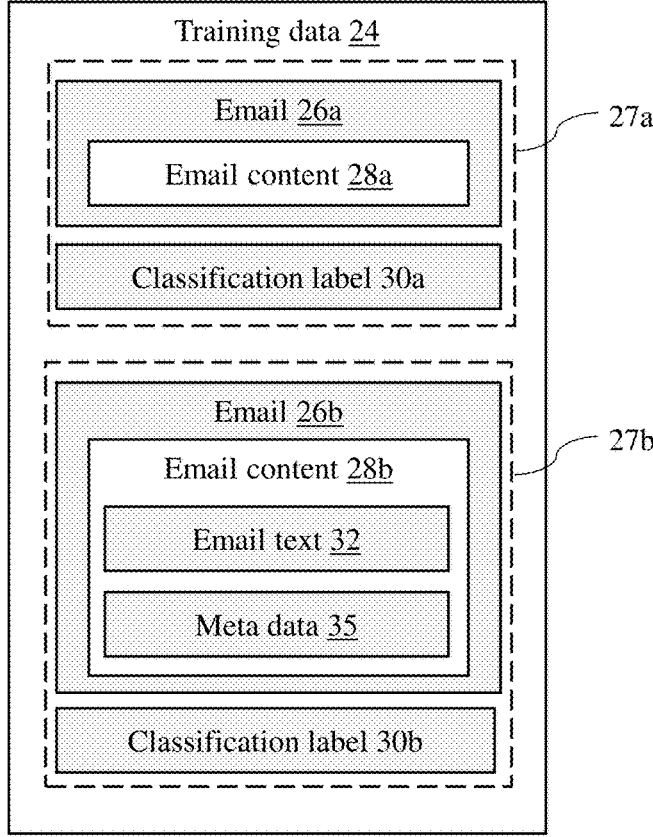
FIG. 2 is a block diagram of an exemplary embodiment of training data.

In the embodiment shown in FIG. 2, the email content 28 provided to the deep learning algorithm 12 includes for each email 26 both text of the email 32 and meta data 35. For example, the text of the email 32 may or may not include HTML tags. The meta data may include any data useful for classifying the emails 26. For example, the meta data for the received emails may include at least one of whether the received email includes links (e.g., a Boolean value), whether the received email is sent using a virtual private network (VPN) (e.g., a Boolean value), a number of recipients of the received email, whether a domain of an email address of a sender of the received email is known (e.g., whether the domain of the sender's email is located in a white list of domain names), or a linkage between the domain of the email address of the sender to links inside a body of the email (e.g., the domain of the sender's email address matches or is associated with a domain of links inside the body of the email). In one embodiment, the metadata is determined using extrinsic information (e.g., information concerning known IP addresses for VPNs).

In one embodiment, the meta data 35 comprises a variety of fields. The fields may have any suitable values (e.g., numerical, Boolean, etc.). The metadata 35 may store any suitable information concerning the email that is useful for classifying the email.

In one embodiment, the processor circuitry 22 is further configured to preprocess the email content 28 before passing the email content 28 to the deep learning algorithm 12. For example, the processor circuitry 22 may be configured to apply a transform 40 to embed the text 32 of the received email, such that the embedded text 42 is included in the email content 28 (e.g., in place of the email text). The transform 40 may apply a label to each word in the text 32 of the received email, such that the applied label is based on the word and a context of the word determined based on text neighboring the word. For example, the transform 40 (e.g., a Bert-based transform) may label each word using an integer numbers or vector.

In another example, the processor circuitry 22 may preprocess the email content 28 by combining the text of the email 32 (e.g., the original text or the transformed text) and the meta data 35 of the email. The text of the email 32 and the meta data 35 for the email 26 may be combined in any suitable manner. For example, the meta data 35 may be concatenated with the embedded text 42 before being passed to the machine learning algorithm. In another example, the processor circuitry 22 may combine the text of the email 32 and the meta data for the email 35 to create a coherent combined space using a neural ordinary differential equation (ODE). The neural ODE may be an equation(s) that binds the velocity (i.e., the derivative of the state vector with respect to time) of an object to a deterministic function of its state (autonomous equations) or state and time (non autonomous).

Figure 3:
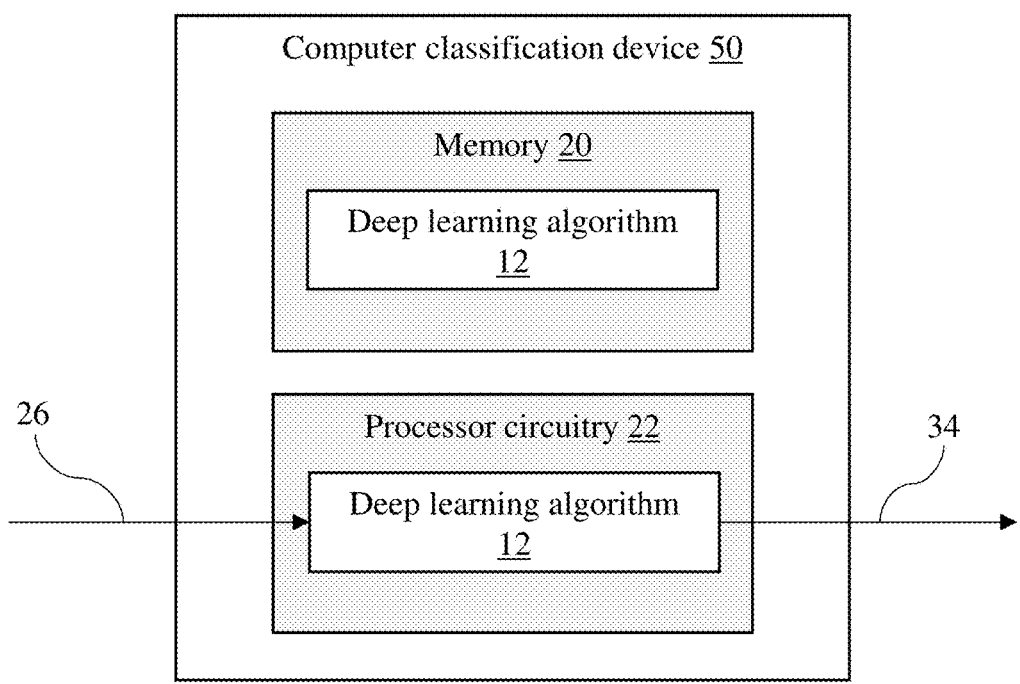
FIG. 3 is a block diagram of an exemplary embodiment of a computer classification device.

In the embodiment shown in FIG. 3, a computer classification device 50 for using the trained deep learning algorithm 12 to classify incoming emails is shown. The classification device includes memory 20 storing the deep learning algorithm 12 and processor circuitry 22. The processor circuitry 22 receives the incoming emails 26 as an input to the deep learning algorithm. As described above, the processor circuitry 22 may preprocess the email content 28 before passing the email 26 to the deep learning algorithm (e.g., by applying a transform to embed the text of the received email). The transform 40 may apply a label to each word in the text of the received email, such that the applied label is based on the word and a context of the word determined based on text neighboring the word.

The processor circuitry 22 also executes the trained deep learning algorithm 12 to classify the received emails 26. For each of the received emails, the deep learning algorithm 12 receives the determined email content 28 and determines multiple classification scores based on the received email content 28. As described above, each of the multiple classification scores is associated with one of the multiple categories and includes a probability that the received email falls into the category associated with the classification score. The deep learning algorithm 12 outputs at least one of the determined multiple classification scores. For example, when determining a classification score for four categories (e.g., clean, marketing, spam, phishing), the deep learning algorithm 12 may output a classification score for each of the four categories.

The processor circuitry 22 classifies the incoming emails based on the at least one classification score output by the deep learning algorithm 12. For example, the deep learning algorithm 12 may output at least two of the determined multiple classification scores 34. For each of the received emails 26, the processor circuitry 22 may classify the received email 26 as one of the classification types based on the outputted at least two classification scores. Alternatively or additionally, the deep learning algorithm 12 may output a classification of the email.

In one embodiment, the processor circuitry 22 applies a classification algorithm to the outputted classification score(s) to classify each of the incoming emails. For example, when classifying an email 26, the deep learning algorithm 12 may output a classification score for each of the possible classifications of the email 26. The classification algorithm may take the outputted classification scores as inputs and output a classification for the email. The classification algorithm may utilize any suitable method for classifying the email 26 based on the outputted classification scores. For example, the classification algorithm may be a heuristic function, a neural network, etc.

In one example, the classification algorithm selects a class for the email based on the largest classification score. However, the classification algorithm may also be set based on business intelligence needs (e.g., selected by the user).

Figure 5:
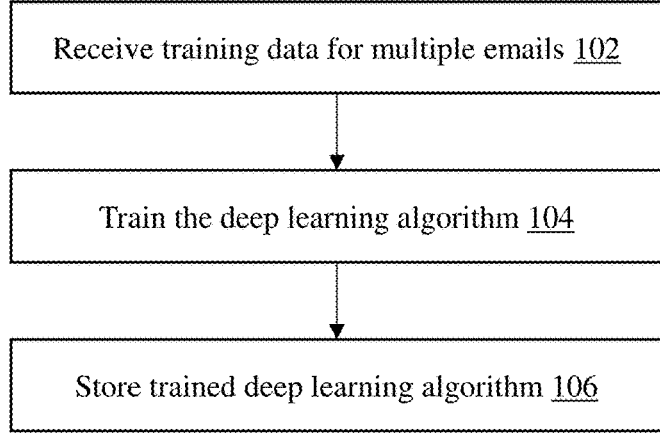
FIG. 5 is a flow diagram of an exemplary method for training a deep learning algorithm to classify emails.

In FIG. 5, an exemplary embodiment of a method 100 is shown for training a deep learning algorithm 12 stored on a non-transitory computer readable medium to classify incoming emails as falling into one of multiple categories and to avoid a low precision risk caused by a number of received emails for at least two of the multiple categories being imbalanced by at least two orders of magnitude. In step 102, the processor circuitry receives training data for multiple emails. In step 104, the processor circuitry trains the deep learning algorithm to determine multiple classification scores using a loss function and to output at least one of the determined multiple classification scores. In step 106, the trained deep learning algorithm is stored in memory.

Figure 6:
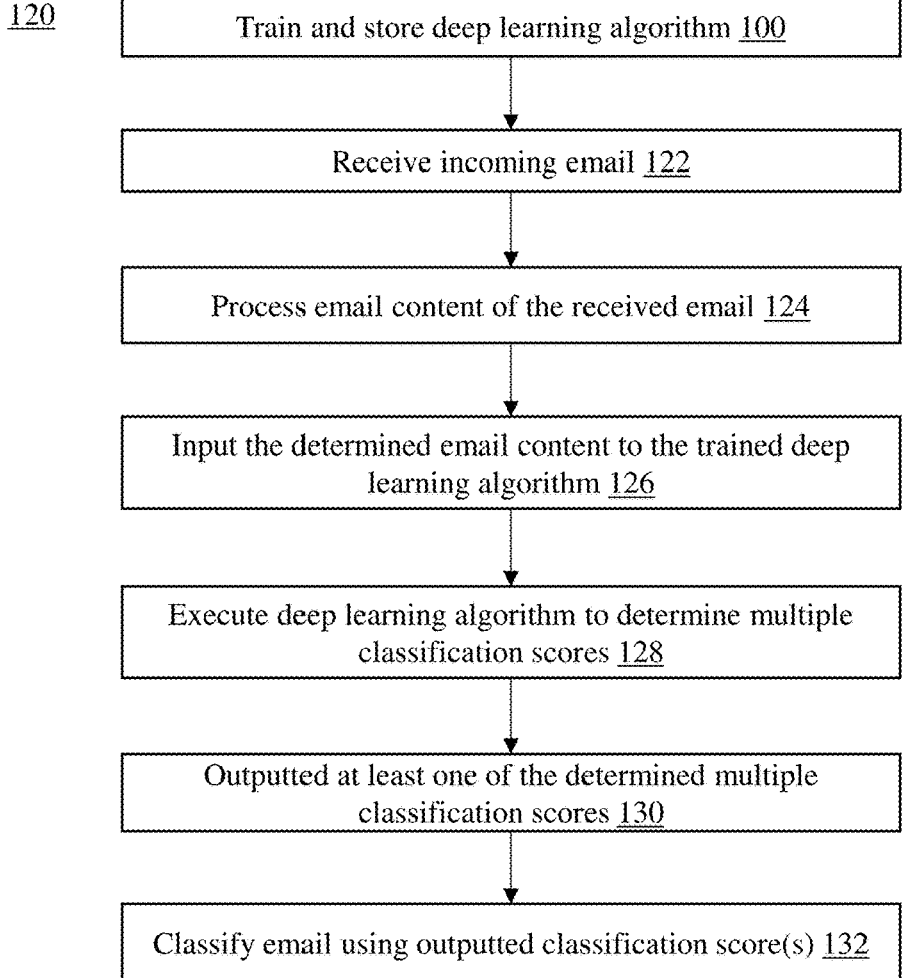
FIG. 6 is a flow diagram of an exemplary method for using a deep learning algorithm to classify emails.

In FIG. 6, an exemplary embodiment of a method 120 is shown for using a trained deep learning algorithm with processor circuitry to classify incoming emails falling into one of multiple categories where a number of received emails for two of the multiple categories is imbalanced. In step 100, the deep learning algorithm is trained and stored as described above. In step 122, an incoming email is received by the processor circuitry. In step 124, email content for the received email is processed determined with the processor circuitry. In step 126, the processed email content is input to the trained deep learning algorithm. In step 128, the deep learning algorithm is executed using the processor circuitry to determine multiple classification scores. In step 130, at least one of the determined multiple classification scores is outputted. In step 132, the incoming emails are classified using the processor circuitry based on the outputted at least one classification scores.

The processor circuitry 22 may have various implementations. For example, the processor circuitry 22 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 22 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 22. The processor circuitry 22 may be communicatively coupled to the computer readable medium and network interface through a system bus, mother board, or using any other suitable structure known in the art.

Deployment of deep learning algorithms as a production engine is often performed in Python environments (as opposed to using languages such as C++, C #, or JAVA). In one embodiment, the deep learning algorithm may be written in the ONNX format to provide an end-to-end online engine that is not Python driven.

As will be understood by one of ordinary skill in the art, the computer readable medium (memory) 20 may be, for example, one or more of a buffer, a flash memory, a hard drive, a removable media, a volatile memory, a non-volatile memory, a random access memory (RAM), or other suitable device. In a typical arrangement, the computer readable medium 20 may include a non-volatile memory for long term data storage and a volatile memory that functions as system memory for the processor 20. The computer readable medium 20 may exchange data with the circuitry over a data bus. Accompanying control lines and an address bus between the computer readable medium 20 and the circuitry also may be present. The computer readable medium 20 is considered a non-transitory computer readable medium.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer training device for training a deep learning algorithm to classify incoming emails as belonging to one of multiple categories and to avoid a low precision risk caused by a number of received emails for at least two of the multiple categories being imbalanced, the deep learning training device comprising:

memory comprising a non-transitory computer readable medium and storing the deep learning algorithm;

processor circuitry configured to:

receive training data for multiple emails, wherein for each of the multiple emails:

the training data includes email content and a correct classification label; and the email content includes both text of the email and meta data for the email;

preprocess the email content by applying a transform to embed the text of the email content and including the embedded text with the training data;

train the deep learning algorithm to determine multiple classification scores using a loss function configured to compensate for the imbalance in the at least two of the multiple categories of emails, and to output at least one of the determined multiple classification scores; and output the trained deep learning algorithm:

wherein the multiple categories include phishing, spam, marketing, and clean;

wherein the imbalance in the at least two of the multiple categories of emails is between the phishing category and the clean category, such that there are more emails in the clean category than in the phishing category;

wherein each of the multiple categories has a criticality identifying the category as non-critical or critical;

wherein the phishing category is identified as critical, and the spam, marketing, and clean categories are each identified as non-critical;

wherein each of the multiple classification scores:

is associated with one of the multiple categories;

estimates a probability that the email falls into the category associated with the classification score; and is based on the email content;

wherein the loss function used to train the deep learning algorithm changes depending on the criticality of the score being determined, such that:

when the deep learning algorithm outputs a classification score for one of the multiple categories identified as non-critical, a primary loss function is used; and when the deep learning algorithm outputs a classification score for one of the multiple categories identified as critical, a critical loss function is used comprising a compensating function modifying the primary loss function; and wherein the compensating function more harshly punishes non-critical emails misidentified as phishing emails than phishing emails misidentified as non-critical emails by outputting:

a lower value when the correct classification label of the email being classified identifies the email as being of the critical category, such that emails belonging to the critical category that are incorrectly classified as belonging to the non-critical category receive the lower value; and a higher value when the correct classification label of the email being classified identifies the email as being of the non-critical category, such that emails belonging to the non-critical category that are incorrectly classified as belonging to the critical category receive the higher value, wherein:

the higher value output by the compensating function increases based on the classification score, such that:

a higher classification score signifying a higher probability of the email being classified as being of the critical category results in a higher value of the output of the compensating function.

2. The computer training device of claim 1, wherein the primary loss function is a cross-entropy function taking as an input each of the classification scores output by the deep learning algorithm.

3. The computer training device of claim 1, wherein the compensating function is a tanh function that takes as an input each of the classification scores output by the deep learning algorithm.

4. The computer training device of claim 1, wherein the compensating function is added to the primary loss function.

5. The computer training device of claim 1, wherein:

before the passing of the email content to the deep learning algorithm, the processor circuitry is configured to apply a transform to embed the text of the email content, such that the embedded text is received with the email content by the deep learning algorithm;

the transform applies a label to each word in the text of the received email, such that the applied label is based on the word and a context of the word determined based on text neighboring the word.

6. The computer training device of claim 1, wherein the preprocessing of the email content by the processor circuitry includes combining the text of the email and the meta data for the email to create a coherent combined space using a neural ordinary differential equation (ODE).

7. The computer training device of claim 1, wherein the meta data for the received emails includes at least one of whether the received email includes links, whether the received email is sent using a virtual private network (VPN), a number of recipients of the received email, whether a domain of an email address of a sender of the received email is known, or a linkage between the domain of the email address of the sender to links inside a body of the email.

8. The computer classification device of claim 1, wherein:

the transform applies a label to each word in the text of the received email, such that the applied label is based on the word and a context of the word determined based on text neighboring the word.

9. A computer classification device for using a deep learning algorithm trained and output by the computer training device of claim 1 to classify incoming emails belonging to one of multiple categories where a number of received emails for two of the multiple categories is imbalanced, the classification device comprising:

memory comprising a non-transitory computer readable medium and storing the deep learning algorithm;

processor circuitry configured to:

receive the incoming emails;

for each of the received emails, preprocess email content of the received email;

execute the trained deep learning algorithm configured to, for each of the received emails:

receive the preprocessed email content;

determine multiple classification scores, wherein each of the multiple classification scores:

is associated with one of the multiple categories;

includes a probability that the received email falls into the category associated with the classification score;

is based on the email content;

output at least one of the determined multiple classification scores;

classify the incoming emails based on the outputted at least one classification scores.

10. The computer classification device of claim 9, wherein:

the deep learning algorithm outputs at least two of the determined multiple classification scores; and for each of the received emails, the processor circuitry is further configured to classify the received email as one of the classification types based on the outputted at least two of the determined multiple classification scores.

11. The computer classification device of claim 9, wherein the deep learning algorithm combines text data and tabular data to create a coherent combined space using a neural ordinary differential equation (ODE).

12. The computer classification device of claim 9, wherein the email content includes both text of the email and meta data for the email, wherein the meta data for the received emails includes at least one of whether the received email includes links, whether the received email is sent using a virtual private network (VPN), a number of recipients of the received email, whether a domain of an email address of a sender of the received email is known, or a linkage between the domain of the email address of the sender to links inside a body of the email.

13. A method for training a deep learning algorithm stored on a non-transitory computer readable medium to classify incoming emails as belonging to one of multiple categories and to avoid a low precision risk caused by a number of received emails for at least two of the multiple categories being imbalanced, the method comprising:

receiving with processor circuitry training data for multiple emails, wherein for each of the multiple emails:

the training data includes email content and a correct classification label; and the email content includes both text of the email and meta data for the email;

preprocessing the email content with the processor circuitry by applying a transform to embed the text of the email content and including the embedded text with the training data;

training the deep learning algorithm with the processor circuitry to:

determine multiple classification scores using a loss function configured to compensate for the imbalance in the at least two of the multiple categories of emails, wherein each of the multiple categories has a criticality identifying the category as non-critical or critical; and outputting the trained deep learning algorithm:

wherein the multiple categories include phishing, spam, marketing, and clean;

wherein the imbalance in the at least two of the multiple categories of emails is between the phishing category and the clean category, such that there are more emails in the clean category than in the phishing category; and wherein the phishing category is identified as critical, and the spam, marketing, and clean categories are each identified as non-critical and output at least one of the determined multiple classification scores, wherein each of the multiple classification scores:

is associated with one of the multiple categories;

estimates a probability that the received email falls into the category associated with the classification score; and is based on the email content;

wherein the loss function used to train the deep learning algorithm changes depending on the criticality of the score being determined, such that:

when the deep learning algorithm outputs a classification score for one of the multiple categories identified as non-critical, a primary loss function is used; and when the deep learning algorithm outputs a classification score for one of the multiple categories identified as critical, a critical loss function is used comprising a compensating function modifying the primary loss function; and wherein the compensating function more harshly punishes non-critical emails misidentified as phishing emails than phishing emails misidentified as non-critical emails by outputting:

a lower score when the correct classification label of the email being classified identifies the email as being of the critical category, such that emails belonging to the critical category that are incorrectly classified as belonging to the non-critical category receive the lower value; and a higher score when the correct classification label of the email being classified identifies the email as being of the non-critical category, such that emails belonging to the non-critical category that are incorrectly classified as belonging to the critical category receive the higher value, wherein:

the higher value output by the compensating function increases based on the classification score, such that:

a higher classification score signifying a higher probability of the email being classified as being of the critical category results in a higher value of the output of the compensating function.

14. The method of claim 13, wherein the primary loss function is a cross-entropy function taking as an input each of the classification scores output by the deep learning algorithm.

15. The method of claim 13, wherein the compensating function is a tanh function that takes as an input each of the classification scores output by the deep learning algorithm.

16. The method of claim 13, wherein the compensating function is added to the primary loss function.

17. A method for using a trained deep learning algorithm with processor circuitry to classify incoming emails belonging to one of multiple categories where a number of received emails for two of the multiple categories is imbalanced, the method comprising:

performing the method of claim 13 for training and outputting the deep learning algorithm stored on the non-transitory computer readable medium;

receiving the incoming emails with the processor circuitry;

for each of the received emails, preprocessing the email
content with the processor circuitry;
executing the trained deep learning algorithm using the
processor circuitry including, for each of the received
emails:
receiving the preprocessed email content;
determining multiple classification scores, wherein
each of the multiple classification scores:
is associated with one of the multiple categories;
includes a probability that the received email falls
into the category associated with the classification
score;
is based on the email content;
outputting at least one of the determined multiple
classification scores; and
classifying the incoming emails using the processor cir-
cuitry based on the outputted at least one classification
scores.
18. The method of claim 17:
wherein the deep learning algorithm outputs at least two
of the determined multiple classification scores; and
further comprising for each of the received emails, using
the processor circuitry to classify the received email as
one of the classification types based on the outputted at
least two of the determined multiple classification
scores.

<div align="center">* * * * *</div>